US007855471B2

(12) United States Patent
Sugawara

(10) Patent No.: US 7,855,471 B2
(45) Date of Patent: Dec. 21, 2010

(54) POWER SUPPLY DEVICE AND IMAGE FORMING APPARATUS

(75) Inventor: Masae Sugawara, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 182 days.

(21) Appl. No.: 12/045,968

(22) Filed: Mar. 11, 2008

(65) Prior Publication Data

US 2008/0224540 A1 Sep. 18, 2008

(30) Foreign Application Priority Data

Mar. 15, 2007 (JP) ............................ 2007-067650
Jan. 30, 2008 (JP) ............................ 2008-019169

(51) Int. Cl.
*H02J 1/00* (2006.01)

(52) U.S. Cl. ............................ 307/46; 399/85; 399/88; 399/89

(58) Field of Classification Search .................. 307/11, 307/18–20, 24–25, 28–29, 31, 43–46, 52; 399/69, 88

See application file for complete search history.

(56) References Cited

U.S. PATENT DOCUMENTS 5,754,419 A * 5/1998 Ho ............................ 363/89
5,786,992 A * 7/1998 Vinciarelli et al. ............ 363/89
6,236,191 B1 * 5/2001 Chaffai ....................... 323/225
6,388,397 B1 * 5/2002 Iwahori ...................... 315/307
6,434,029 B1 * 8/2002 Cyr et al. ...................... 363/86
6,525,513 B1 * 2/2003 Zhao ......................... 323/222
6,542,705 B2 * 4/2003 Fujita et al. .................. 399/69
6,753,515 B2 6/2004 Miyahara et al.
6,847,792 B2 * 1/2005 Nakafuji et al. ............... 399/69
6,941,088 B2 * 9/2005 Atsushi et al. ................ 399/69
6,946,629 B2 9/2005 Miyahara et al.
7,002,112 B2 * 2/2006 Kishi et al. ................. 219/482
7,024,128 B2 * 4/2006 Hiroto ........................ 399/88
7,054,570 B2 * 5/2006 Kishi et al. .................. 399/67
7,122,767 B2 10/2006 Sato et al.
7,127,189 B2 * 10/2006 Takamatsu et al. ............ 399/69
7,135,660 B2 11/2006 Miyahara et al.
7,214,985 B2 * 5/2007 Lotfi et al. .................. 257/336
7,215,101 B2 * 5/2007 Chang ........................ 323/224
7,245,510 B2 * 7/2007 Baurle et al. ............ 363/21.12

(Continued)

FOREIGN PATENT DOCUMENTS

JP 8-79913 3/1996

(Continued)

*Primary Examiner*—Jared Fureman
*Assistant Examiner*—Adi Amrany
(74) *Attorney, Agent, or Firm*—Oblon, Spivak, McClelland, Maier & Neustadt, L.L.P.

(57) ABSTRACT

A voltage converting unit converts a first voltage of an auxiliary power supply unit into a second voltage. A voltage determining unit determines whether the second voltage exceeds a predetermined threshold. A first switch, which is arranged between the voltage converting unit and a load, switches on and off a supply of an electric power of the second voltage to the load. When it is determined that the second voltage exceeds the predetermined threshold, a voltage-conversion control unit controls the voltage converting unit to stop converting the voltage, and then a switching control unit controls the first switch to supply the electric power of the second voltage to the load.

12 Claims, 7 Drawing Sheets

U.S. PATENT DOCUMENTS

| | | | | |
|---|---|---|---|---|
| 7,336,002 | B2 * | 2/2008 | Kato et al. | 307/10.6 |
| 7,405,954 | B2 * | 7/2008 | Baurle et al. | 363/21.12 |
| 7,498,783 | B2 * | 3/2009 | Johnson | 323/282 |
| 7,546,057 | B2 * | 6/2009 | Muraishi | 399/88 |
| 7,583,910 | B2 * | 9/2009 | Matsumoto et al. | 399/69 |
| 7,609,988 | B2 * | 10/2009 | Kishi et al. | 399/69 |
| 7,622,898 | B2 * | 11/2009 | Shimizu et al. | 320/166 |
| 2003/0030421 | A1 * | 2/2003 | Loef et al. | 323/285 |
| 2004/0202490 | A1 * | 10/2004 | Okamoto | 399/69 |
| 2004/0251854 | A1 * | 12/2004 | Matsuda et al. | 315/291 |
| 2007/0059016 | A1 * | 3/2007 | Sato et al. | 399/88 |
| 2007/0212103 | A1 * | 9/2007 | Kikuchi | 399/88 |
| 2008/0031652 | A1 * | 2/2008 | Yoda | 399/94 |
| 2008/0112722 | A1 * | 5/2008 | Hasegawa | 399/70 |
| 2008/0253787 | A1 * | 10/2008 | Yoda | 399/69 |
| 2008/0304852 | A1 * | 12/2008 | Kishi | 399/88 |
| 2009/0033294 | A1 * | 2/2009 | Odajima et al. | 320/166 |

FOREIGN PATENT DOCUMENTS

| | | |
|---|---|---|
| JP | 2004-159405 | 6/2004 |
| JP | 2004-286869 | 10/2004 |
| JP | 2006-17866 | 1/2006 |
| JP | 2006-58731 | 3/2006 |
| JP | 2006-58732 | 3/2006 |
| JP | 2006-58824 | 3/2006 |
| JP | 2006-78608 | 3/2006 |
| JP | 2006-78700 | 3/2006 |
| JP | 2006-78708 | 3/2006 |
| JP | 2006-78771 | 3/2006 |
| JP | 2006-106717 | 4/2006 |
| JP | 2006-106725 | 4/2006 |
| JP | 2006-139154 | 6/2006 |
| JP | 2006-154409 | 6/2006 |
| JP | 2006-162919 | 6/2006 |
| JP | 2006-171089 | 6/2006 |
| JP | 2006-208686 | 8/2006 |
| JP | 2006-209142 | 8/2006 |
| JP | 2006-211768 | 8/2006 |

* cited by examiner

POWER SUPPLY DEVICE AND IMAGE FORMING APPARATUS

CROSS-REFERENCE TO RELATED APPLICATIONS

The present application claims priority to and incorporates by reference the entire contents of Japanese priority documents, 2007-067650 filed in Japan on Mar. 15, 2007 and 2008-019169 filed in Japan on Jan. 30, 2008.

BACKGROUND OF THE INVENTION

1. Field of the Invention

The present invention relates to a power supply device including an auxiliary power supply unit and an image forming apparatus including the power supply device.

2. Description of the Related Art

In general, a typical power supply device used in an image forming apparatus supplies an electric power from a commercial power source to each load by converting an alternating-current (AC) voltage of the electric power into a direct-current (DC) voltage in a rectifier/smoothing circuit and controlling a predetermined constant voltage of the electric power to be supplied. When a heavy load is required, for example, for making copies, the electric power supplied from only the commercial power source may not be enough. Therefore, the image forming apparatus usually includes an auxiliary power supply unit composed of a capacitor. The auxiliary power supply unit is preliminarily charged with an electric power from the commercial power source. When a power shortage occurs or is anticipated, the auxiliary power supply unit supplies the charged electric power to each load by discharging the electric power via a discharge circuit (see, for example, Japanese Patent Application Laid-open Publication No. 2004-286869).

The load usually requires a high voltage and a high power, so that it is preferable that the capacitor of the auxiliary power supply unit has a high withstand voltage and a high charge capacity. However, a typical capacitor has a low withstand voltage, so that a plurality of capacitor cells needs to be connected in series with one another to enable the capacitor to withstand a high voltage. Such a capacitor is very expensive because a large number of the capacitor cells are required. Therefore, the number of the capacitor cells is reduced, and a DC/DC converter (a voltage converting unit) is provided to the discharge circuit located in a subsequent stage of the capacitor. An electric power discharged from the capacitor is boosted by the DC/DC converter, and the boosted electric power is supplied to each load.

However, with the above configuration, when the power supply device supplies an electric power to a load in which an inrush current (a starting current) is generated, and the load starts being driven, a high current from the capacitor is temporarily flown into the a load located in a subsequent stage of the DC/DC converter through the DC/DC converter. Due to the high current, a power loss occurs at a coil of the DC/DC converter, and thereby decreasing an efficiency of the DC/DC converter. In addition, the DC/DC converter needs to be the one with an element capable of withstanding the high current, so that a cost of the power supply device increases.

SUMMARY OF THE INVENTION

It is an object of the present invention to at least partially solve the problems in the conventional technology.

According to an aspect of the present invention, there is provided a power supply device including an auxiliary power supply unit that is charged with a direct-current electric power; a voltage converting unit that converts a first voltage of the auxiliary power supply unit into a second voltage; a voltage-conversion control unit that controls the voltage converting unit; a voltage determining unit that determines whether the second voltage exceeds a predetermined threshold; a first switch that is arranged between the voltage converting unit and a load, the first switch switching on and off a supply of an electric power of the second voltage to the load; and a switching control unit that controls the first switch. When the voltage determining unit determines that the second voltage exceeds the predetermined threshold, the voltage-conversion control unit controls the voltage converting unit to stop converting the voltage, and then the switching control unit controls the first switch to supply the electric power of the second voltage to the load.

Furthermore, according to another aspect of the present invention, there is provided an image forming apparatus including a power supply device that supplies an electric power to a load. The power supply device includes an auxiliary power supply unit that is charged with a direct-current electric power, a voltage converting unit that converts a first voltage of the auxiliary power supply unit into a second voltage, a voltage-conversion control unit that controls the voltage converting unit, a voltage determining unit that determines whether the second voltage exceeds a predetermined threshold, a first switch that is arranged between the voltage converting unit and a load and that switches on and off a supply of an electric power of the second voltage to the load, and a switching control unit that controls the first switch. When the voltage determining unit determines that the second voltage exceeds the predetermined threshold, the voltage-conversion control unit controls the voltage converting unit to stop converting the voltage, and then the switching control unit controls the first switch to supply the electric power of the second voltage to the load.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. A power supply device according to the present invention is applied to a copier as an example of an image forming apparatus in the embodiments, but not limited to the copier. The power supply device according to the present invention can be applied to a multifunction product (MFP), a printer, a facsimile machine, and the like.

Figure 1:
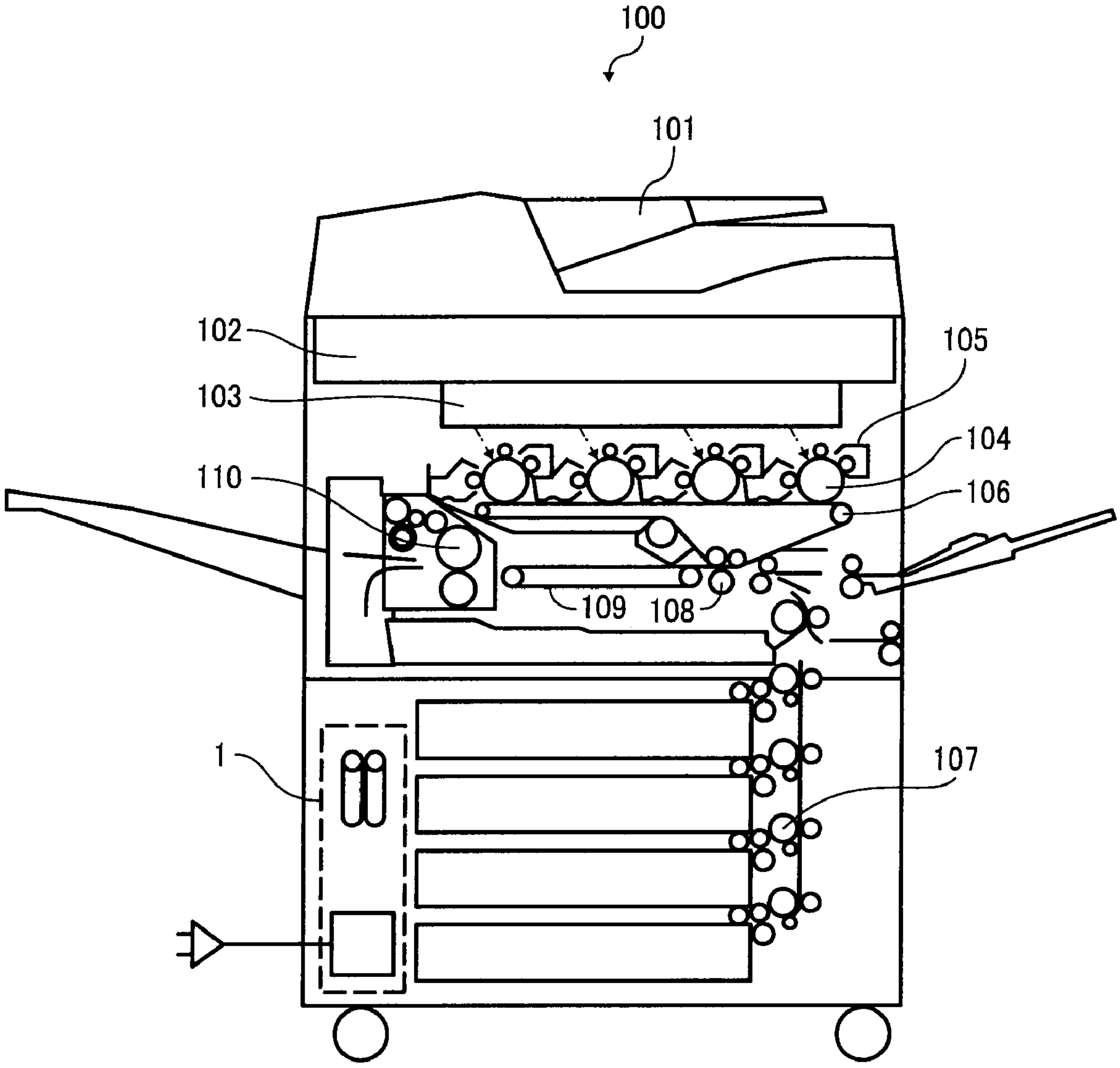
FIG. 1 is a side view of a copier as an example of an image forming apparatus including a power supply device according to a first embodiment of the present invention.

FIG. 1 is a side view of a copier 100 including a power supply device 1 according to a first embodiment of the present invention. The copier 100 includes an automatic document feeder (ADF) 101, a scanner unit 102, an image writing unit 103, a photosensitive unit 104, a developing unit 105, a primary transfer unit 106, a sheet feeding unit 107, a secondary transfer unit 108, a conveying belt 109, a fixing unit 110, and the power supply device 1.

The ADF 101 sequentially feeds a document to the scanner unit 102. Upon receiving the document, the scanner unit 102 emits a light to the document, and reads out an image of the document by reading the light reflected from the document. The image read out by the scanner unit 102 is processed into image data, and the image data is output to the image writing unit 103. Upon receiving the image data, the image writing unit 103 drives a laser diode (LD) to form a latent image corresponding to the image data on a photosensitive drum included in the photosensitive unit 104. The developing unit 105 develops the latent image formed on the photosensitive drum into a toner image by attaching a toner to the latent image. Incidentally, when the copier 100 is a full-color copier, the photosensitive unit 104 includes four photosensitive drums on which yellow (Y), magenta (M), cyan (C), and black (Bk) toner images are respectively formed.

The toner image on the photosensitive drum is transferred onto an intermediate transfer belt of the primary transfer unit 106. In a case of a full-color image, Y, M, C, and Bk toner images are sequentially transferred onto the intermediate transfer belt in a superimposed manner. The sheet feeding unit 107 feeds a sheet in keeping with a timing when all the Y, M, C, and Bk toner images are transferred onto the intermediate transfer belt. The superimposed toner images on the intermediate transfer belt are transferred onto the sheet at once. The conveying belt 109 conveys the sheet onto which the superimposed toner images (hereinafter, "the full-color toner image") are transferred to the fixing unit 110. The fixing unit 110 fixes the full-color toner image on the sheet by the application of heat and pressure.

Figure 2:
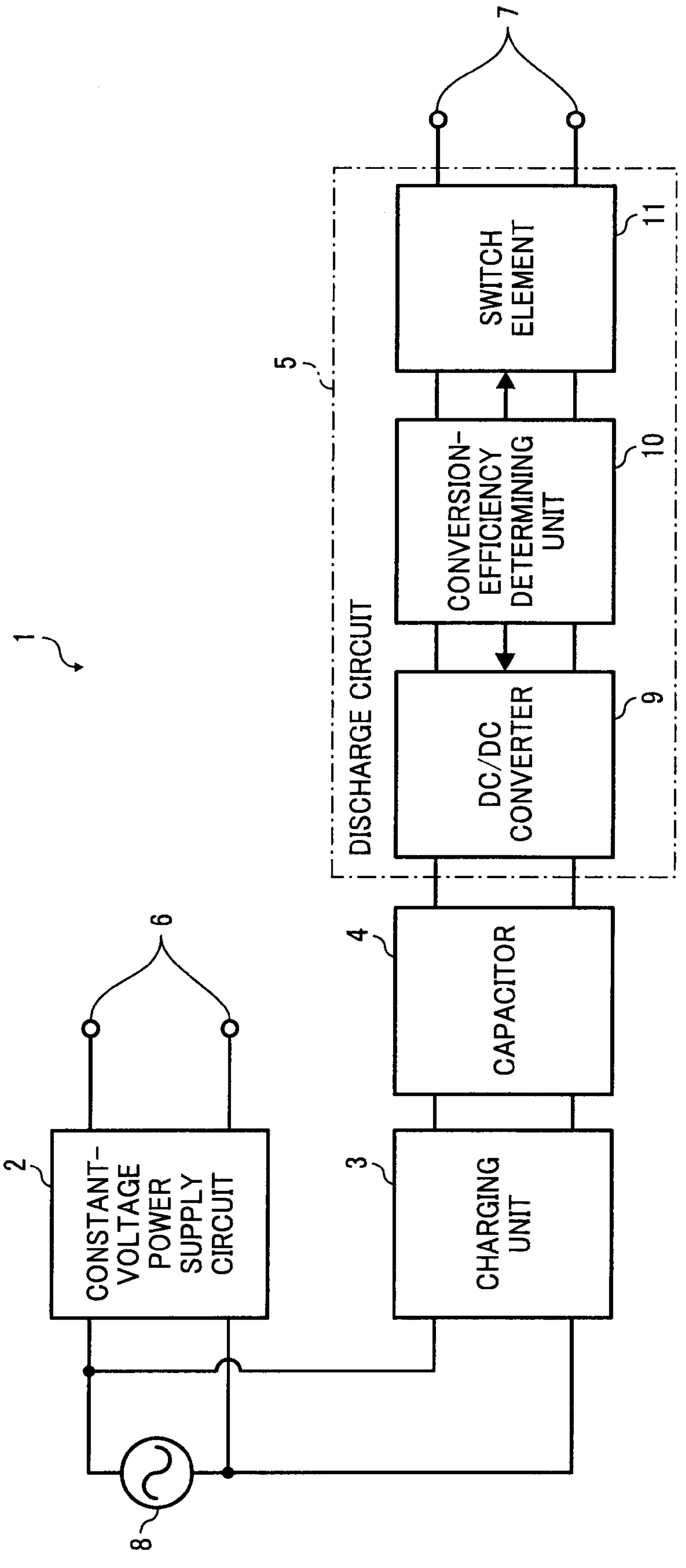
FIG. 2 is a block diagram of the power supply device shown in FIG. 1.

The power supply device 1 supplies an electric power to a heater of the fixing unit 110 and other loads such as a motor. FIG. 2 is a block diagram of the power supply device 1 according to the first embodiment. The power supply device 1 includes a constant-voltage power supply circuit 2, a charging unit 3, a capacitor 4, a discharge circuit 5, an output terminal 6, and an output terminal 7.

The constant-voltage power supply circuit 2 converts an AC voltage from a commercial AC power source 8 into a predetermined DC voltage (a constant voltage), and supplies the DC voltage to a load located in a subsequent stage of the output terminal 6. The charging unit 3 converts the AC voltage from the commercial AC power source 8 into a predetermined DC voltage, and charges the capacitor 4 with the DC voltage. Incidentally, the DC voltage converted from the AC voltage by the constant-voltage power supply circuit 2 is larger than that is converted from the AC voltage by the charging unit 3 in general. The capacitor 4 serves as an auxiliary power supply unit. After charged with an electric charge of the DC voltage output from the charging unit 3, the capacitor 4 discharges a discharge voltage (the DC voltage) to the discharge circuit 5. For example, an electric double layer capacitor with a relatively high capacitance is used as the capacitor 4. It is also possible to use an aluminum electrolytic condenser with a capacitance of 9900 μF or more as the capacitor 4. In the present embodiment, the capacitor is employed as the auxiliary power supply unit. Alternatively, a battery can be used as the auxiliary power supply unit.

The discharge circuit 5 is a circuit for controlling a discharge of the capacitor 4. Specifically, the discharge circuit 5 converts a discharge voltage from the capacitor 4 into a high voltage, and supplies the high voltage to a load located in a subsequent stage of the output terminal 7. The discharge circuit 5 includes a DC/DC converter 9, a conversion-efficiency determining unit 10, and a switch element 11.

Figure 3:
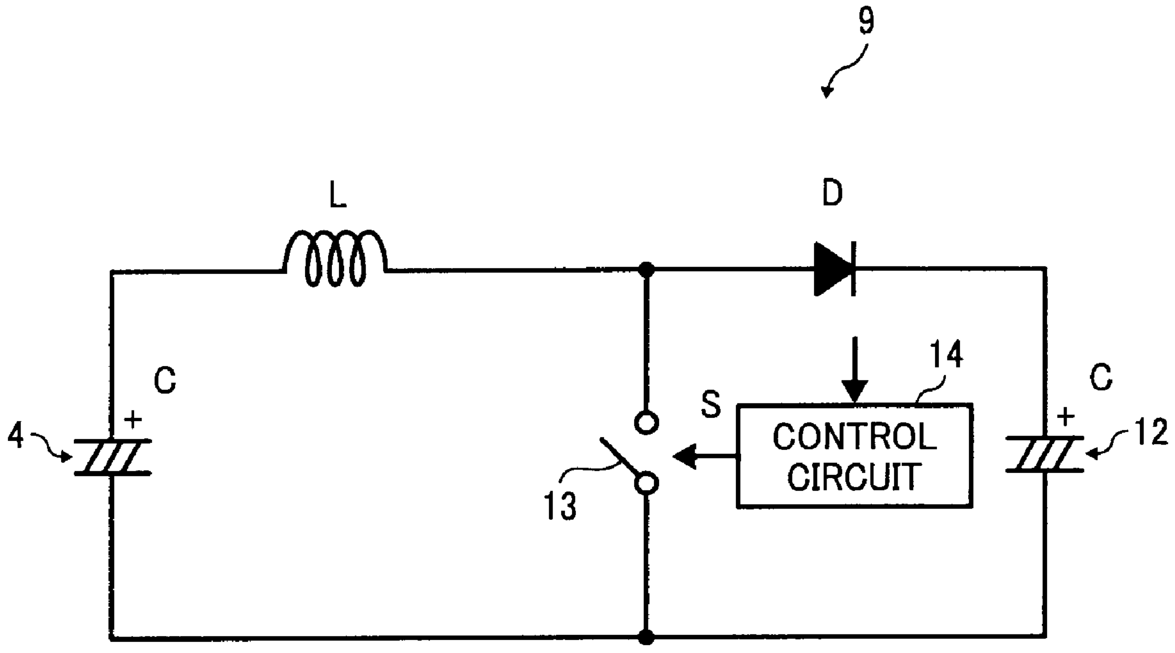
FIG. 3 is a circuit diagram of a DC/DC converter shown in FIG. 2.

The DC/DC converter 9 is a voltage converting unit that converts the discharge voltage from the capacitor 4 into a predetermined voltage capable of being used in the load located in the subsequent stage of the output terminal 7 by a soft-switching method. Generally, a boost type DC/DC converter is used as the DC/DC converter 9. In other words, the DC/DC converter 9 converts a low voltage from the capacitor 4 into a high voltage capable of being used in the load located in the subsequent stage of the output terminal 7. FIG. 3 is a circuit diagram of the DC/DC converter 9. The DC/DC converter 9 includes a capacitor 12, a switch 13, and a control circuit 14. Incidentally, the DC/DC converter 9 shown in FIG. 3 is simplified. The actual DC/DC converter further includes protection circuits such as an inrush-current protection circuit.

The capacitor 12 is arranged in the last stage of the DC/DC converter 9, and temporarily charged with an electric charge of the converted (boosted) voltage. For example, an aluminum electrolytic condenser is used as the capacitor 12.

The switch 13 is a switching element. The switch 13 creates a desired boosted voltage by a soft-switching (an opening/closing movement) of the switch 13, and supplies the created voltage to the capacitor 12. When the switch 13 needs not create the boosted voltage because the capacitor 12 is already charged with a predetermined electric charge, the switch 13 is turned OFF (opened). When, an output voltage from the capacitor 12 decreases due to a decrease of the electric charge charged in the capacitor 12 because the electric charge is supplied to the load located in the subsequent stage of the output terminal 7, the soft-switching of the switch 13 is started again.

The control circuit 14 controls the opening/closing movement (the soft-switching) of the switch 13 based on an instruction from a control unit (not shown) of the copier 100 or the conversion-efficiency determining unit 10.

The conversion-efficiency determining unit 10 determines a state of the converted voltage charged in the capacitor 12 (conversion efficiencies on the primary and secondary sides of the DC/DC converter 9) as a voltage determining unit, and controls an opening/closing movement of the switch element 11 as a switching control unit, and also controls the control circuit 14 (the opening/closing movement of the switch 13) as a voltage-conversion control unit. The switch element 11 is used for switching between a supply of a high-voltage electric power output from the DC/DC converter 9 to the load located in the subsequent stage of the output terminal 7 and a shutoff of the supply by the opening/closing movement of the switch element 11.

The output terminal 6 supplies the electric power output from the constant-voltage power supply circuit 2 to the load located in the subsequent stage of the output terminal 6. The output terminal 7 supplies the electric power output from the switch element 11 to the load located in the subsequent stage of the output terminal 7.

An operation of the power supply device 1 is explained in detail below. The power supply device 1 supplies a converted electric power to the load located in the subsequent stage either directly or indirectly as appropriate. In a case of the direct supply, the power supply device 1 supplies an electric power converted by the constant-voltage power supply circuit 2 directly to the load located in the subsequent stage of the output terminal 6 (for example, the heater of the fixing unit 110). In a case of the indirect supply, the power supply device 1 supplies an electric power that a voltage charged in the capacitor 4 is converted into a high voltage by the discharge circuit 5 indirectly to the load located in the subsequent stage of the output terminal 7 (for example, the motor). In addition, there is a case in which the power supply device 1 performs the direct supply and the indirect supply at the same time. For example, the power supply device 1 supplies the electric power directly to the heater of the fixing unit 110, and at the same time, supplies the electric power indirectly to the motor.

A voltage conversion performed by the DC/DC converter 9 is explained in detail below.

Upon receiving an instruction from the control unit (not shown) of the copier 100, the control circuit 14 causes to start the soft-switching of the switch 13. Incidentally, in the beginning, the switch element 11 is turned OFF (opened). By the soft-switching of the switch 13, a voltage discharged from the capacitor 4 is converted (boosted) into a high voltage. An electric charge of the high voltage is output to the capacitor 12 to be temporarily charged in the capacitor 12.

The conversion-efficiency determining unit 10 determines a state of the converted voltage charged in the capacitor 12 (conversion efficiencies on the primary and secondary sides of the DC/DC converter 9), and further determines whether the electric charge charged in the capacitor 12 exceeds a threshold. The conversion-efficiency determining unit 10 determines the electric charge based on the voltage output from the capacitor 12. Alternatively, the conversion-efficiency determining unit 10 can determine the electric charge based on an output current or an output electric power from the capacitor 12. When the conversion-efficiency determining unit 10 determines that a predetermined voltage is generated in the capacitor 12 because the electric charge charged in the capacitor 12 exceeds the threshold, the conversion-efficiency determining unit 10 instructs the control circuit 14 to stop the soft-switching of the switch 13 so that the switch 13 is turned OFF (opened). As a result, the voltage conversion is temporarily stopped.

Then, the conversion-efficiency determining unit 10 causes the switch element 11 to be turned ON (closed). As a result, the electric charge charged in the capacitor 12 is flown into the load located in the subsequent stage of the output terminal 7 through the output terminal 7, so that the load is driven.

In a conventional power supply device, the switch element 11 is turned ON (closed) without stopping the soft-switching of the switch 13. In this case, if the load located in the subsequent stage of the output terminal 7 is the heater of the fixing unit 110, when a supply of the electric power to the heater is started even though a temperature of the heater is low, an inrush current (a starting current) from the capacitor 4 is flown into the heater through the DC/DC converter 9. If the load located in the subsequent stage of the output terminal 7 is the motor, when a supply of the electric power to the motor is started even though the motor is not driven to rotate, an inrush current (a starting current) from the capacitor 4 is flown into the motor through the DC/DC converter 9. In either case, a high current is flown through the DC/DC converter 9, and thereby causing an increase of a power loss and decreasing the efficiency. Therefore, it is necessary to use an expensive DC/DC converter with an element capable of withstanding the high current as the DC/DC converter 9.

On the other hand, in the power supply device 1 according to the first embodiment, while the inrush current (the starting current) is flown into the load located in the subsequent stage of the output terminal 7 through the DC/DC converter 9 as a supply of the electric power to the load is started, only the electric charge charged in the capacitor 12 is flown into the load, and no current is flown into the other circuits. Therefore, no high current is flown through the DC/DC converter 9, so that the power loss can be reduced. In addition, it is possible to use a cheap DC/DC converter as the DC/DC converter 9 because the DC/DC converter 9 needs not withstand the high current.

The inrush current (the starting current) is flown into the load located in the subsequent stage of the output terminal 7 through the DC/DC converter 9 only for a short time just after the supply of the electric power to the load is started, so that the control circuit 14 causes to start the soft-switching of the switch 13 automatically just after a lapse of a predetermined time so that the DC/DC converter 9 restarts the voltage conversion. After that, the normal operation is performed accordingly.

Incidentally, when the conversion-efficiency determining unit 10 determines that a voltage generated in the capacitor 12 is dropped due to a discharge of the electric charge from the capacitor 12, the conversion-efficiency determining unit 10 can instruct the control circuit 14 to cause to start the soft-switching of the switch 13 so that the DC/DC converter 9 restarts the voltage conversion.

In this manner, in the power supply device 1 according to the first embodiment, when the discharge circuit 5 converts a voltage charged in the capacitor 4 as the auxiliary power supply unit into a high voltage, and supplies the high voltage to the load located in the subsequent stage of the output terminal 7, a predetermined amount of an electric charge of the high voltage is charged in the capacitor 12 included in the DC/DC converter 9. Then, after the switching of the switch 13 (the voltage conversion) is temporarily stopped, the electric charge charged in the capacitor 12 is supplied to the load located in the subsequent stage of the output terminal 7. Therefore, it is possible to prevent the DC/DC converter 9 from an inrush current (a starting current) when the load located in the subsequent stage of the output terminal 7 starts being driven.

Figure 4:
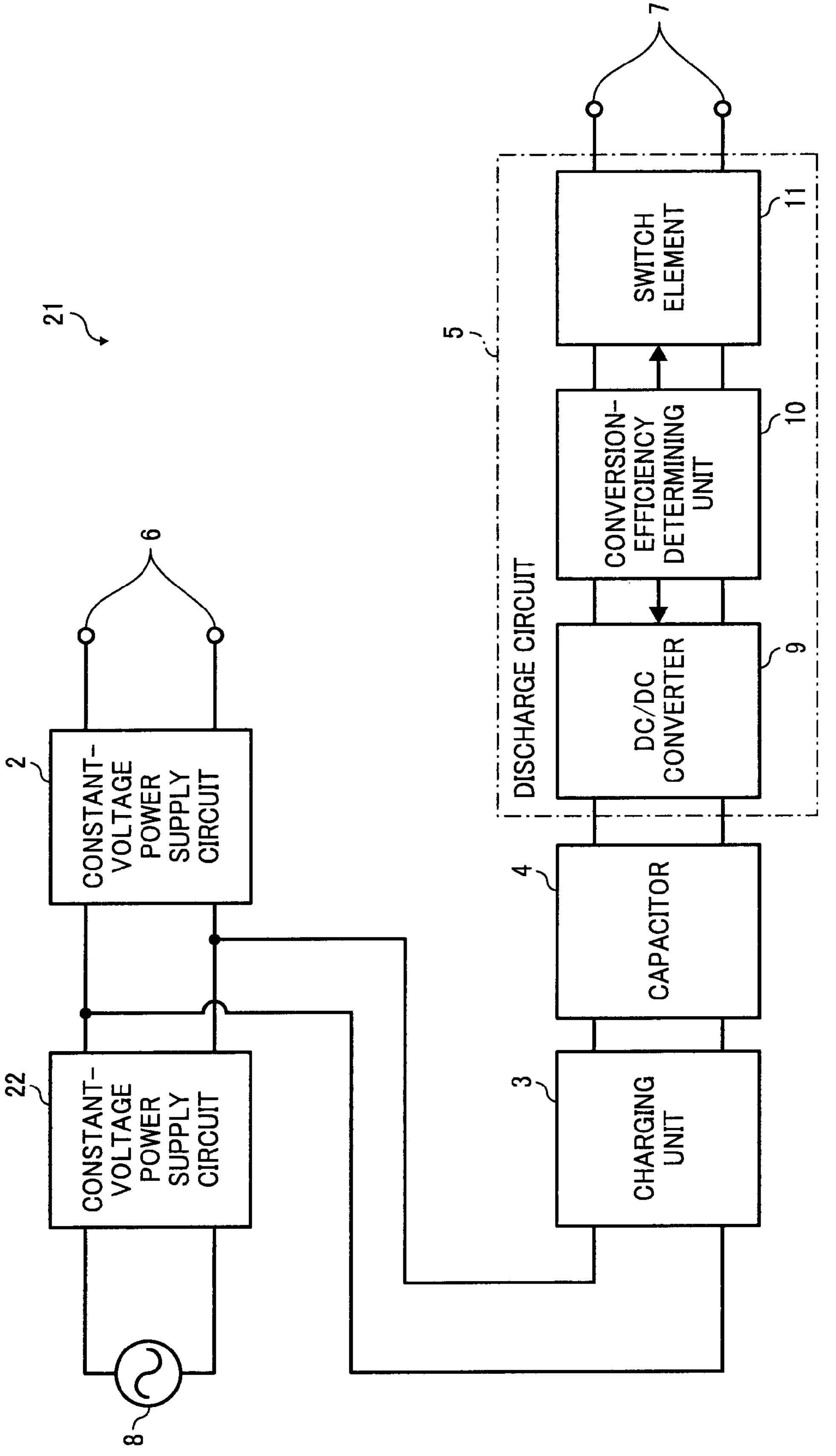
FIG. 4 is a block diagram of a power supply device according to a second embodiment of the present invention.

A power supply device 21 according to a second embodiment of the present invention is explained below with reference to FIG. 4. The portions identical to those in FIG. 2 for the first embodiment are denoted with the same reference numerals, and the description of those portions is omitted.

The power supply device 21 supplies an electric power to the heater of the fixing unit and other loads. A difference between the power supply device 1 and the power supply device 21 is that the power supply device 21 further includes a constant-voltage power supply circuit 22 for a power factor improvement.

The constant-voltage power supply circuit 22 is arranged in the first stage of the power supply device 21, specifically between the commercial AC power source 8 and each of the constant-voltage power supply circuit 2 and the charging unit 3. The constant-voltage power supply circuit 22 includes a DC/DC converter for a power factor improvement. The constant-voltage power supply circuit 22 converts an AC voltage from the commercial AC power source 8 into a predetermined DC voltage, and supplies the DC voltage to the constant-voltage power supply circuit 2 or the charging unit 3. Therefore, the power supply device 21 is slightly inferior to the power supply device 1 in a power-saving capability. However, a power factor of an electric power from the commercial AC power source 8 can be improved by the constant-voltage power supply circuit 22, so that a harmonic current flowing through the power supply device 21 can be reduced. It is preferable that at least any one of the constant-voltage power supply circuit 22, the constant-voltage power supply circuit 2, and the charging unit 3 employs a soft-switching circuit.

In this manner, in the power supply device 21 according to the second embodiment, the constant-voltage power supply circuit 22 is provided between the commercial AC power source 8 and each of the constant-voltage power supply circuit 2 and the charging unit 3. Therefore, a power factor of an electric power from the commercial AC power source 8 can be improved, and thus it is possible to use the electric power from the commercial AC power source 8 more effectively.

Figure 5:
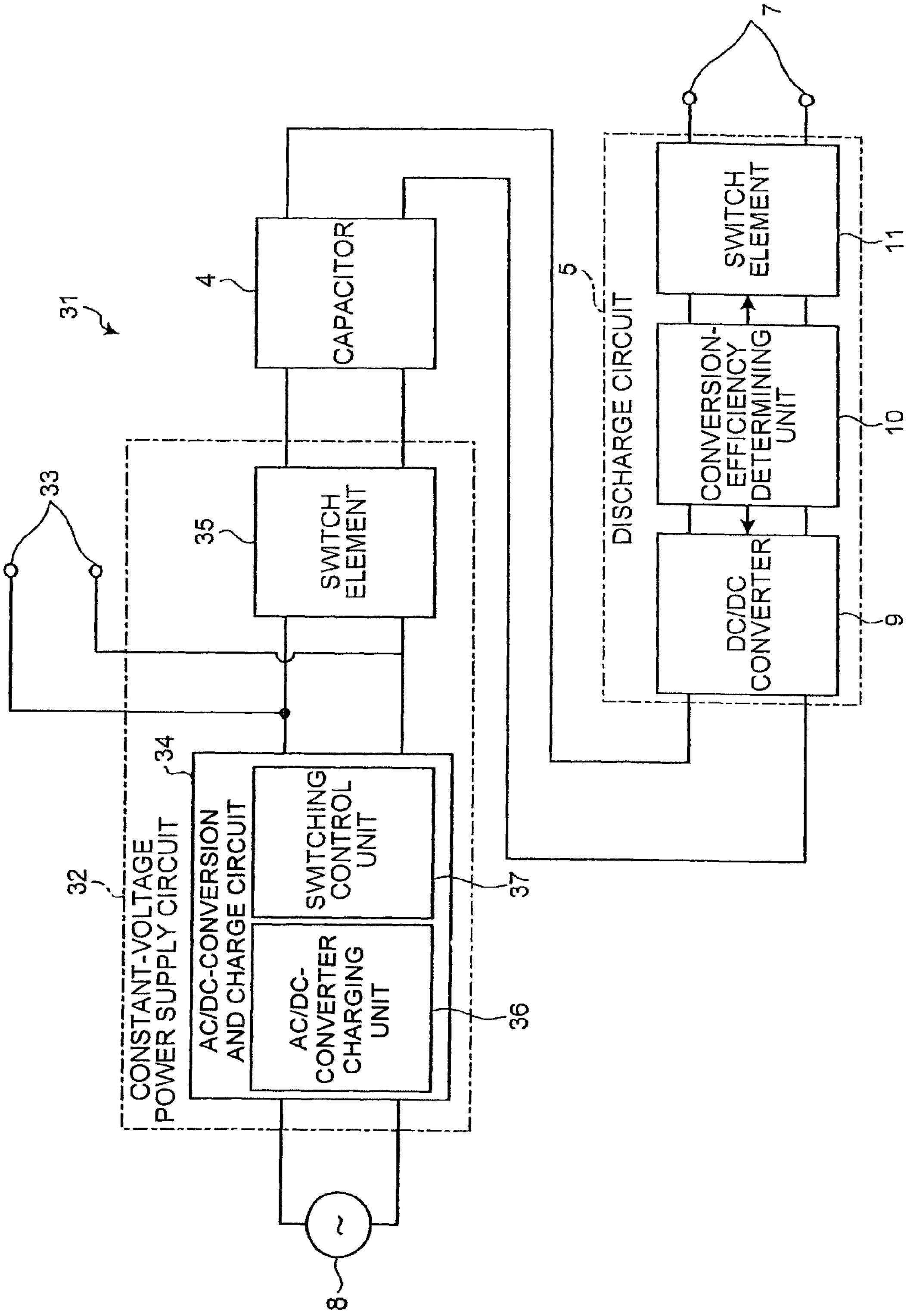
FIG. 5 is a block diagram of a power supply device according to a third embodiment of the present invention.

A power supply device 31 according to a third embodiment of the present invention is explained below with reference to FIG. 5. The portions identical to those in FIG. 2 for the first embodiment are denoted with the same reference numerals, and the description of those portions is omitted.

In the power supply device 31, functions of the constant-voltage power supply circuit 2 and the charging unit 3 in the power supply device 1 are combined into one circuit.

The power supply device 31 supplies an electric power to the heater of the fixing unit and other loads. The power supply device 31 includes a constant-voltage power supply circuit 32, the capacitor 4, the discharge circuit 5, an output terminal 33, and the output terminal 7.

The constant-voltage power supply circuit 32 converts an AC voltage from the commercial AC power source 8 into a predetermined DC voltage, and alternately supplies the DC voltage directly to a load located in a subsequent stage of the output terminal 33 and to the capacitor 4 to charge the capacitor 4. Namely, the constant-voltage power supply circuit 32 has both a constant-voltage supplying function and a charging function. Incidentally, the DC voltage converted to be directly-supplied to the load located in the subsequent stage of the output terminal 33 by the constant-voltage power supply circuit 32 is larger than that is converted to be supplied to the capacitor 4 by the constant-voltage power supply circuit 32 in general. The constant-voltage power supply circuit 32 includes a AC/DC-conversion and charge circuit 34 and a switch element 35.

The AC/DC-conversion and charge circuit 34 alternately performs a process of converting an AC voltage from the commercial AC power source 8 into a predetermined DC voltage (hereinafter, "a constant-voltage converting process") and a process of charging the capacitor 4 with a predetermined DC voltage (hereinafter, "a charging process"). The AC/DC-conversion and charge circuit 34 includes a AC/DC-converter charging unit 36 and a switching control unit 37.

The converter AC/DC-converter charging unit 36 converts an AC voltage from the commercial AC power source 8 into a predetermined DC voltage, and supplies the DC voltage to the load located in the subsequent stage of the output terminal 33 or the capacitor 4. Incidentally, the AC/DC-converter charging unit 36 can employ the soft-switching method. Additionally, a AC/DC-converter can be provided in a previous stage of the AC/DC-converter charging unit 36 to be used as a constant-voltage power supply for a power factor improvement.

The switching control unit 37 controls a switching between the constant-voltage converting process and the charging process to be performed by the AC/DC-conversion and charge circuit 34. As one of methods for the control, the switching control unit 37 controls an opening/closing movement of the switch element 35.

By the opening/closing movement of the switch element 35, between a supply of an electric power output from the AC/DC-converter charging unit 36 to the capacitor 4 and a shutoff of the supply are switched. When the supply of the electric power output from the AC/DC-converter charging unit 36 to the capacitor 4 is shut off by the movement of the switch element 35, the electric power output from the AC/DC-converter charging unit 36 (the constant-voltage power supply circuit 32) is transmitted to the load located in the subsequent stage of the output terminal 33 through the output terminal 33.

An operation of the power supply device 31 is explained in detail below. When the AC/DC-conversion and charge circuit 34 charges the capacitor 4, the switching control unit 37 controls the switch element 35 to be turned ON (closed). As a result, a DC voltage is supplied to the capacitor 4, and a charge of the capacitor 4 is started. The capacitor 4 is charged with a constant current first, and a constant electric power next, and again the constant current at last.

Upon completion of the charge of the capacitor 4, the capacitor 4 discharges a voltage to the discharge circuit 5 located in a subsequent stage of the capacitor 4, and the switching control unit 37 controls the switch element 35 to be turned OFF (opened). A predetermined constant voltage (a DC voltage) converted from the AC voltage by the AC/DC-conversion and charge circuit 34 is directly transmitted to the load located in the subsequent stage of the output terminal 33 through the output terminal 33. Therefore, the power supply device 31 can improve the efficiency as compared with the power supply device 1 including the constant-voltage power supply circuit 2 and the charging unit 3 separately because the number of circuits included in the power supply device 31 is less than that of the power supply device 1 by one.

In this manner, in the power supply device 31 according to the third embodiment, the constant-voltage power supply circuit 32 has both the constant-voltage supplying function and the charging function. Therefore, a charging unit needs not be provided to the power supply device 31. Thus, the power supply device 31 can achieve a space saving and a cost reduction.

Figure 6:
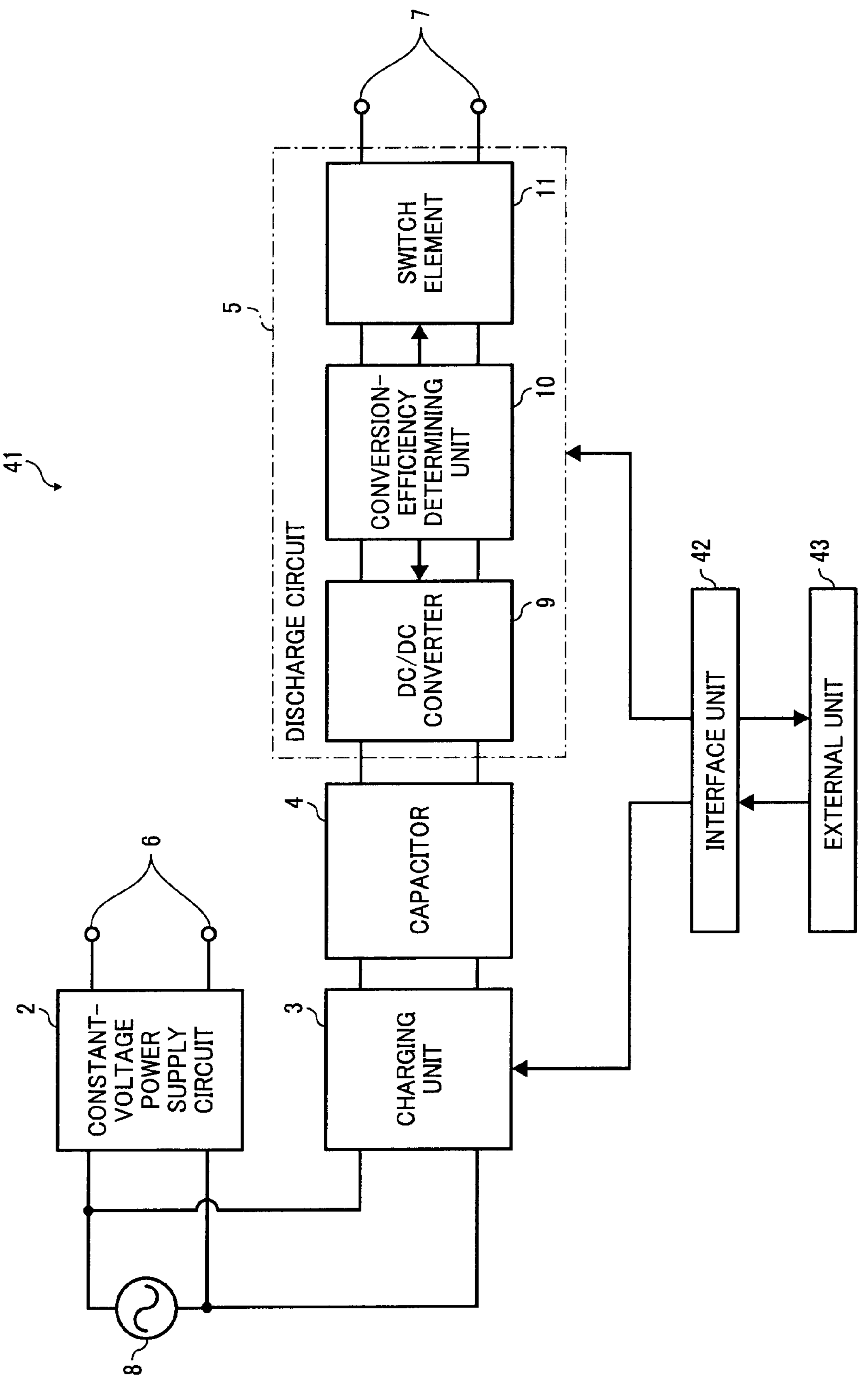
FIG. 6 is a block diagram of a power supply device according to a fourth embodiment of the present invention.

A power supply device 41 according to a fourth embodiment of the present invention is explained below with reference to FIG. 6. The portions identical to those in FIG. 2 for the first embodiment are denoted with the same reference numerals, and the description of those portions is omitted.

The power supply device 41 supplies an electric power to the heater of the fixing unit and other loads. A difference between the power supply device 1 and the power supply device 41 is that the power supply device 41 further includes an interface unit 42 connected to an external unit 43.

The interface unit 42 establishes a communication with the external unit 43. Specifically, when the power supply device 41 receives a signal from the external unit 43 via the interface unit 42, and the signal is output to the charging unit 3 and the discharge circuit 5.

Upon receiving the signal, the charging unit 3 and the discharge circuit 5 respectively recognize an operation state of the external unit 43 based on the signal, and perform either a charge process or a discharge process depending on the operation state. In the present embodiment, when the operation state of the external unit 43 is a chargeable state, the charging unit 3 and the discharge circuit 5 perform the charge process. Conversely, when the operation state of the external unit 43 is a dischargeable state, the charging unit 3 and the discharge circuit 5 perform the discharge process.

In the present embodiment, a signal received from the external unit 43 via the interface unit 42 is output to the charging unit 3 and the discharge circuit 5. Alternatively, a control unit (not shown) of the discharge circuit 5 can receive a signal received from the external unit 43, and output the signal to the charging unit 3.

Furthermore, in the present embodiment, the charging unit 3 and the discharge circuit 5 respectively recognize an operation state of the external unit 43 based on the received signal, and perform either the charge process or the discharge process depending on the operation state. Alternatively, the charging unit 3 and the discharge circuit 5 can recognize whether the external unit 43 instructs a charge mode or a discharge mode, and perform either the charge process or the discharge process depending on the recognized mode.

In this manner, in the power supply device 41 according to the fourth embodiment, the charging unit 3 and the discharge circuit 5 respectively recognize an operation state of the external unit 43 based on a signal received from the external unit 43, and perform either the charge process or the discharge process depending on the operation state. Therefore, when the operation state of the external unit 43 is the chargeable state, the charging unit 3 and the discharge circuit 5 perform the charge process. Conversely, when the operation state of the external unit 43 is the dischargeable state, the charging unit 3 and the discharge circuit 5 perform the discharge process. Consequently, it is possible to adjust a total input current, and thus it is possible to reduce a power consumption.

Figure 7:
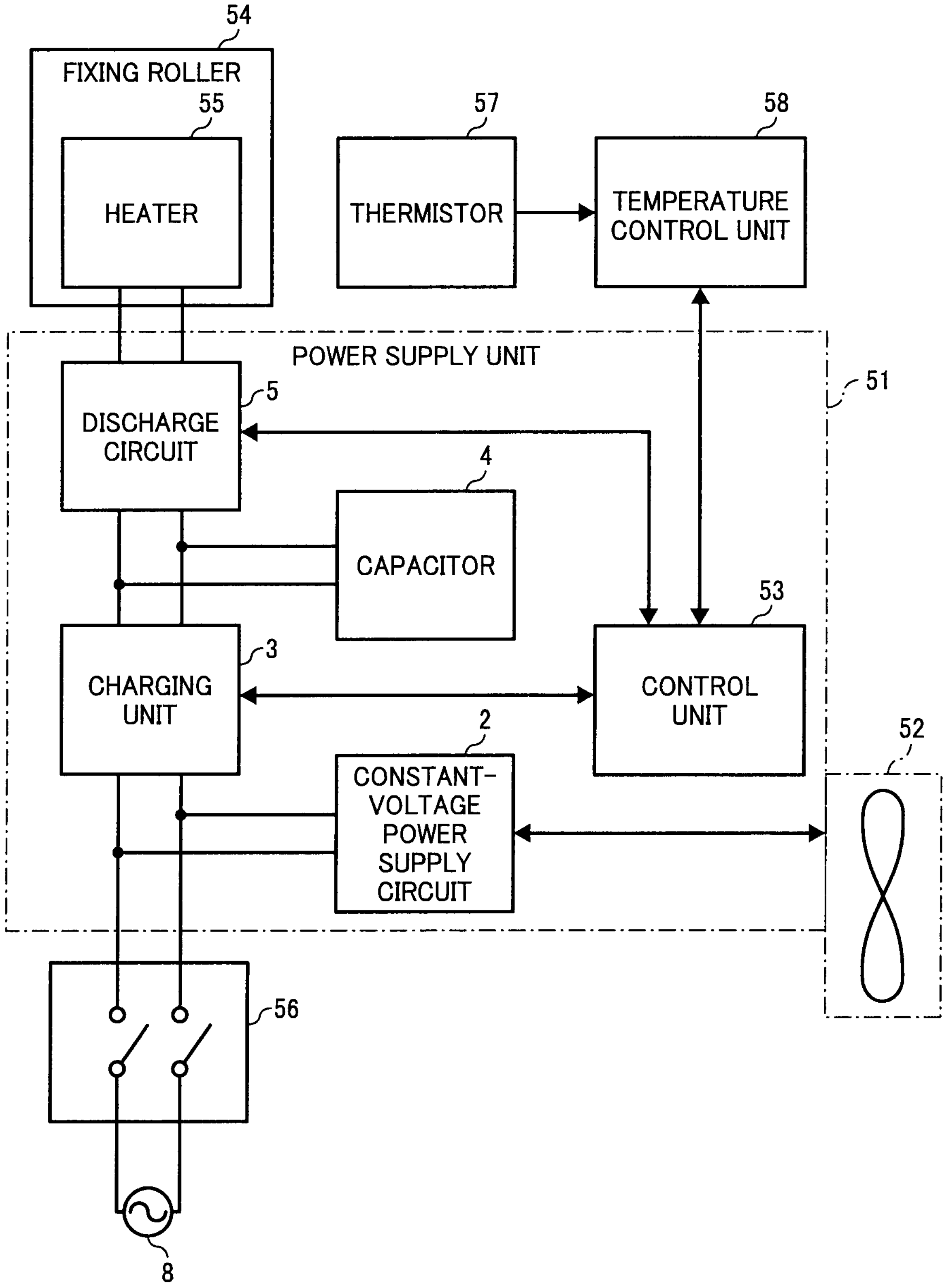
FIG. 7 is a block diagram of a power supply device according to a fifth embodiment of the present invention.

A power supply device 51 according to a fifth embodiment of the present invention is explained below with reference to FIG. 7. The portions identical to those in FIG. 2 for the first embodiment are denoted with the same reference numerals, and the description of those portions is omitted.

The power supply device 51 supplies an electric power discharged from the capacitor 4 (the auxiliary power supply unit) to a heater 55 of the fixing unit, and also supplies an electric power from the constant-voltage power supply circuit 2 to a fan 52 for suppressing increases of temperatures of the copier and the power supply device 51. The power supply device 51 includes the constant-voltage power supply circuit 2, the charging unit 3, the capacitor 4, the discharge circuit 5, and a control unit 53. The discharge circuit 5 includes a DC/DC converter, a conversion-efficiency determining unit, and a switch element.

In the present embodiment, the constant-voltage power supply circuit 2 supplies a DC voltage to the fan 52 as a load located in a subsequent stage of the constant-voltage power supply circuit 2, and the discharge circuit 5 discharges a DC voltage to the heater 55 built-in a fixing roller 54 of the fixing unit as a load located in a subsequent stage of the discharge circuit 5. The heater 55 produces a heat by the use of an electric power from the discharge circuit 5.

The control unit 53 controls the charging unit 3 whether to perform a charge of the capacitor 4 with an electric power from the commercial AC power source 8, and also controls the discharge circuit 5 whether to perform a discharge of the electric power charged in the capacitor 4 to the heater 55.

An operation of the power supply device 51 is explained in detail below. An electric power from the commercial AC power source 8 is supplied to the charging unit 3 via a main power-supply switch 56 so that the charging unit 3 can charge the capacitor 4 with the electric power. A supply of the electric power or a shutoff of the supply is controlled by an opening/closing movement of the main power-supply switch 56. When the main power-supply switch 56 is turned ON (closed), the control unit 53 outputs a charge ON signal to the charging unit 3. Upon receiving the charge ON signal from the control unit 53, the charging unit 3 charges the capacitor 4. Upon completion of the charge of the capacitor 4, the control unit 53 outputs a discharge ON signal to the discharge circuit 5. Upon receiving the discharge ON signal from the control unit 53, the discharge circuit 5 discharges the electric power charged in the capacitor 4 to the heater 55 via the discharge circuit 5, and the fixing roller 54 is heated by the heater 55. A thermistor 57 monitors a temperature of the fixing roller 54, and feeds back a result of the monitoring to a temperature control unit 58 included in the copier (the external unit) so that the temperature control unit 58 can control the fixing roller 54 whether to be warm up or cool down. To prevent an increase of a temperature of the power supply device 51, the fan 52 exhausts a heat generated inside the power supply device 51 and the copier.

Incidentally, any of the power supply device 51 and other power supply devices can supply a control voltage to the temperature control unit 58. In the present embodiment, the power supply device 51 supplies an electric power to the fixing unit included in the copier. Alternatively, the power supply device 51 can supply an electric power to any other loads.

In this manner, the power supply device 51 according to the fifth embodiment can supply an electric power discharged from the capacitor 4 (the auxiliary power supply unit) to the heater 55 of the fixing unit, and also supply an electric power from the constant-voltage power supply circuit 2 to the fan 52.

The power supply device according to any of the embodiments can be applied to a computer program. The computer program that causing a computer to execute the same functions as the power supply device is charged in a computer-readable recording medium. The computer program charged in the recording medium is realized by being loaded by a central processing unit (CPU) or a micro processing unit (MPU) of the computer. As the recording medium, any of a semiconductor recording medium, such as a read-only memory (ROM) or a nonvolatile memory card, an optical recording medium, such as a digital versatile disk (DVD), a magnetooptic disk (MO), a magnetic disk (MD), or a compact disk recordable (CD-R), and a magnetic recording medium, such as a magnetic tape or a flexible disk (FD) can be used. Based on an instruction of the computer program, an operation system or the like performs each process fully or partially. Alternatively, the computer program can be charged in a recording device, such as a hard disk drive (HDD), of a server computer so that a user of a computer connected to the server computer via a network can download the computer program. Moreover, the server computer can distribute the computer program via the network. In this manner, the functions of the power supply device can be achieved in the form of the computer program. Therefore, it is possible to distribute the computer program with improvements in a cost performance, a portability, and a versatility.

As described above, according to an aspect of the present invention, a discharge circuit converts a voltage charged in a capacitor as an auxiliary power supply unit into a high voltage, and supplies the converted voltage to a load located in a subsequent stage of the discharge circuit. At this time, after a predetermined amount of an electric charge of the converted voltage is charged in a capacitor of a DC/DC converter (a voltage converting unit) included in the discharge circuit, a switching of a switch included in the DC/DC converter is stopped once so that the DC/DC converter stops performing a voltage conversion, and then the electric charge is supplied to the load located in the subsequent stage. Therefore, it is possible to prevent the DC/DC converter from an inrush current (a starting current).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:

an auxiliary power supply unit configured to be charged with a direct-current electric power, the auxiliary power supply unit being a second capacitor;

a constant-voltage power supply unit that includes a charging unit configured to convert an alternating-current electric power from an alternating-current power source into direct-current power, a third switch, and a first switching control unit configured to alternate a supply of converted direct-current power between a first load and the second capacitor via the third switch;

a voltage converting unit configured to convert a first voltage of the auxiliary power supply unit into a second voltage, the voltage converting unit including a second switch, and a first capacitor, wherein the voltage converting unit is configured to control a soft-switching of the second switch that switches on and off a supply of electric power of a second voltage to the first capacitor, and generate voltage by the soft-switching of the second switch, the voltage converting unit stopping voltage generation when the second switch halts the soft-switching and becomes an open state;

a voltage-conversion control unit configured to control the voltage converting unit;

a voltage determining unit configured to determine whether the second voltage exceeds a predetermined threshold;

a first switch that is arranged between the voltage converting unit and a second load, the first switch switching on and off a supply of an electric power of the second voltage to the second load; and a second switching control unit that controls the first switch, wherein when the voltage determining unit determines that the second voltage exceeds the predetermined threshold, the voltage-conversion control unit controls the voltage converting unit to stop converting the voltage, and then the second switching control unit controls the first switch to supply the electric power of the second voltage to the second load, wherein while an inrush current flows into a second load located in a subsequent stage of an output terminal through the voltage converting unit as a supply of the electric power, only an electric charge charged in the first capacitor flows into the second load, and as a result no high current flows through the voltage converting unit and power loss is reduced.

2. The power supply device according to claim 1, wherein the first capacitor is temporarily charged with the electric power of the second voltage, and the voltage converting unit supplies a charged electric power to the second load, and when the voltage determining unit determines that the second voltage of the charged electric power exceeds the predetermined threshold, the voltage-conversion control unit controls the second switch to stop supplying the electric power of the second voltage to the first capacitor.

3. The power supply device according to claim 2, wherein when the voltage determining unit determines that the second voltage drops below the predetermined threshold, the voltage-conversion control unit controls the voltage converting unit to resume converting the voltage.

4. The power supply device according to claim 2, wherein the voltage converting unit converts the first voltage into the second voltage by a soft-switching of the second switch.

5. The power supply device according to claim 1, wherein the voltage-conversion control unit controls the voltage converting unit to resume converting the voltage in a predetermined time.

6. The power supply device according to claim 1, further comprising a constant-voltage power supply unit that converts an alternating-current voltage from the alternating-current power source into a direct-current voltage, wherein the charging unit charges the auxiliary power supply unit with a converted direct-current electric voltage.

7. The power supply device according to claim 1, further comprising an interface unit that is connected to an external unit to establish a communication with the external unit, wherein when the power supply device receives a signal from the external unit via the interface unit, the charging unit determines an operation state of the external unit based on the signal, and controls charging of the auxiliary power supply unit depending on the operation state.

8. The power supply device according to claim 7, wherein when the power supply device receives the signal from the external unit via the interface unit, the voltage-conversion control unit determines the operation state of the external unit based on the signal, and controls the voltage converting unit to convert the voltage depending on the operation state.

9. The power supply device according to claim 1, wherein the voltage converting unit converts the first voltage into the second voltage by boosting the first voltage.

10. The power supply device according to claim 1, wherein the second load is a heater.

11. The power supply device according to claim 1, wherein the second load is a motor.

12. An image forming apparatus comprising:

a power supply device configured to supply an electric power to a second load, the power supply device including an auxiliary power supply unit configured to be charged with a direct-current electric power, the auxiliary power supply unit being a second capacitor, a constant-voltage power supply unit that includes a charging unit configured to convert an alternating-current electric power from an alternating-current power source into direct-current power, a third switch, and a first switching control unit configured to alternate a supply of converted direct-current power between a first load and the second capacitor via the third switch;

a voltage converting unit configured to convert a first voltage of the auxiliary power supply unit into a second voltage, the voltage converting unit including a second switch, and a first capacitor, wherein the voltage converting unit is configured to control a soft-switching of the second switch that switches on and off a supply of electric power of a second voltage to the first capacitor, and generate voltage by the soft-switching of the second switch, the voltage converting unit stopping voltage generation when the second switch halts the soft-switching and becomes an open state;

a voltage-conversion control unit configured to control the voltage converting unit, a voltage determining unit configured to determine whether the second voltage exceeds a predetermined threshold, a first switch that is arranged between the voltage converting unit and a second load, the first switch switching on and off a supply of an electric power of the second voltage to the second load, and a second switching control unit that controls the first switch, wherein when the voltage determining unit determines that the second voltage exceeds the predetermined threshold, the voltage-conversion control unit controls the voltage converting unit to stop converting the voltage, and then the second switching control unit controls the first switch to supply the electric power of the second voltage to the second load, wherein while an inrush current flows into a second load located in a subsequent stage of an output terminal through the voltage converting unit as a supply of the electric power, only an electric charge charged in the first capacitor flows into the second load, and as a result no high current flows through the voltage converting unit and power loss is reduced.

* * * * *